Figure 1:
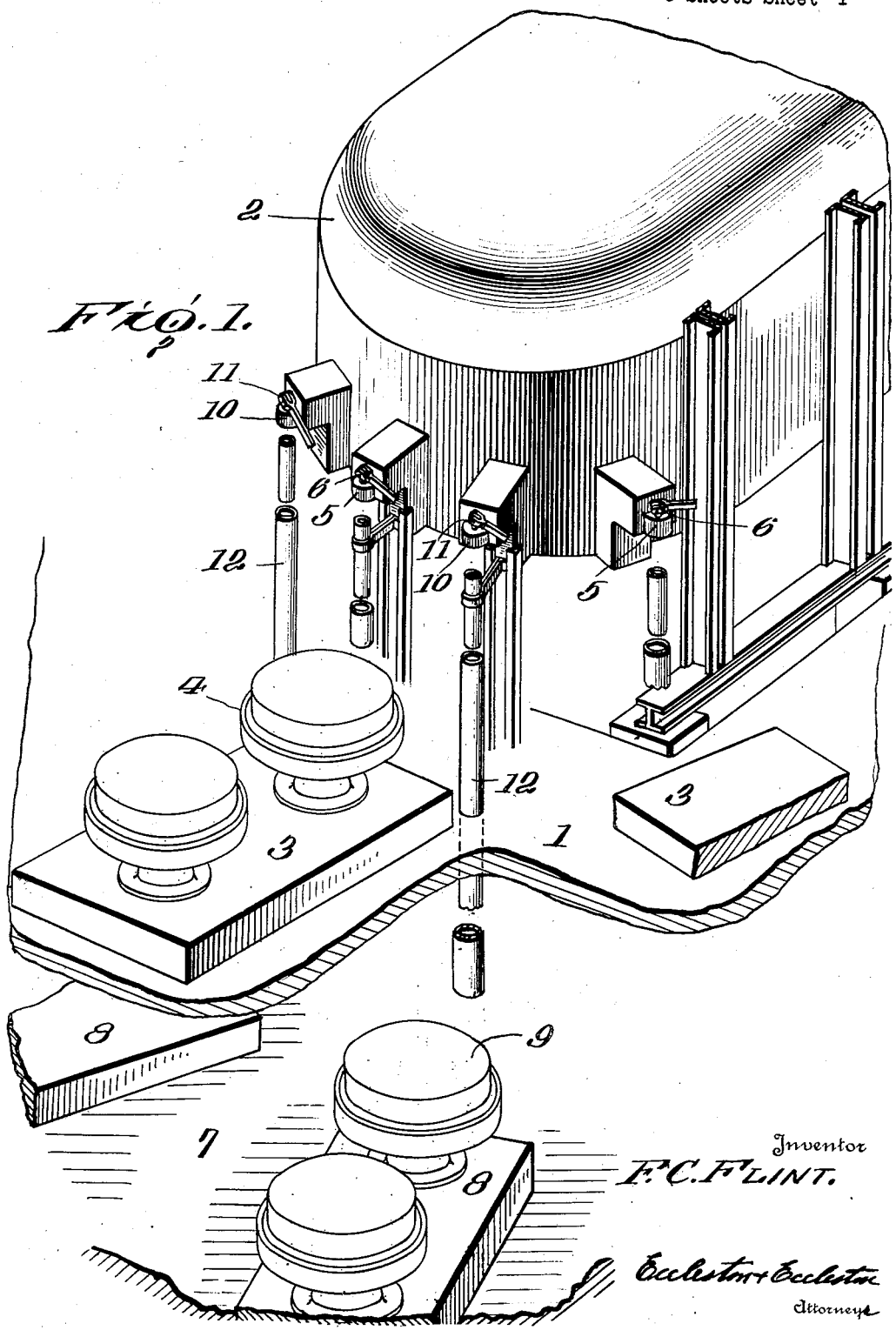

June 17, 1930. F. C. FLINT 1,764,832
METHOD AND APPARATUS FOR INCREASING THE PRODUCTION OF GLASS
Filed Jan. 25, 1929 3 Sheets-Sheet 3

Inventor
F. C. FLINT.
By
Eccleston & Eccleston
Attorney

Patented June 17, 1930

1,764,832

UNITED STATES PATENT OFFICE

FRANCIS C. FLINT, OF WASHINGTON, PENNSYLVANIA, ASSIGNOR TO HAZEL-ATLAS GLASS CO., OF WHEELING, WEST VIRGINIA, A CORPORATION OF WEST VIRGINIA

METHOD AND APPARATUS FOR INCREASING THE PRODUCTION OF GLASS

Application filed January 25, 1929. Serial No. 335,045.

In the manufacture of glass, the melting tanks or furnaces cannot be designed solely on theoretical or practical principles to produce the most efficient and economical results. This is due largely to practical problems met in the forming of the molten glass into formed glass articles. The forming machines are large and the tank must be designed to accommodate the greatest possible number of these forming machines. And to accommodate the desired number of forming machines per tank, it has always been necessary to design the tank with a much greater melting area than is sufficient to melt and refine the required amount of glass for the number of machines employed. This results in a great waste of fuel, for the fuel which is employed to melt the excess batch and to maintain the excess glass at the required temperature until it is finally supplied to the forming machines, is a complete loss. The ideal condition, which has been impossible of attainment heretofore, is to have such an arrangement that there are a sufficient number of forming machines in cooperative relation with the melting tank to consume the total capacity of the tank. That is, all of the glass will be used just as soon as it is melted. The present invention renders possible such a condition.

The present invention solves another very important practical problem in the manufacture of glassware. Of course, glass tanks are constructed of various sizes dependent upon the particular capacity desired; and the number of forming machines vary with the size of the tank. For the present purpose, let it be assumed that the tank is of such size as to accommodate eight conventional forming machines of a start and stop type; and let it also be assumed that the average production of each machine is twenty articles per minute. Forming machines have been developed, of the continuous or non-stop type, which have a much higher rate of production than the conventional start and stop machines. But these faster machines are much larger than the conventional machines in common use, and hence only three or four of them can be accommodated to a tank of such size as to accommodate eight of the conventional machines. Therefore, it is a problem to decide whether the practical results of a less number of faster but larger machines warrants the replacement of the larger number of slower but smaller machines. This has undoubtedly delayed a more general use of continuous machines. In accordance with the present invention, it is possible to retain the present number of conventional start and stop machines and add the necessary number of continuous machines to operate the tank at full capacity, and thus not only greatly increase the production of ware, but also effect a fuel economy in the manner mentioned hereinbefore.

The addition of continuous machines to supplement the conventional start and stop machines is mentioned merely by way of example; for the invention contemplates, and in fact as now operated in accordance with the present invention, constitutes an increase in the number of start and stop machines beyond the number possible in previously known practices. The number of conventional machines may be supplemented by the addition of continuous machines, or by the addition of start and stop machines, or by an increase in the number of machines, or by an increase in the number of any desired type of machine; the essential point being that by means of the present invention it is possible to increase the production of glassware per tank, and at the same time operate the tank more efficiently as to fuel consumption by using all of the glass just as it is melted, rather than have an over sized melting area with its consequent fuel wastage. So that in accordance with the present invention all of the fuel that is consumed, is consumed for useful purposes, and in addition to this economy in fuel consumption, the amount of glassware produced per tank, is greatly increased.

It is needless to attempt to set forth the numerous advantages of the present invention, as they will be readily recognized by those skilled in the glass art; but it may be mentioned here that by means of the present invention better grade ware is produced;

for the charges are introduced into the mold in such manner as to produce a better finish on the necks of bottles, and also the charges are rendered more uniform as to temperature, and the shear mark is practically eliminated. All of which results in the packing of a higher percentage of ware than was heretofore possible. Also, as will appear hereinafter, the charges enter the mold so quickly that it is possible to use fast continuous machines without the necessity of employing guides to insure the entry of the charges into the molds.

The invention will be clearly understood from the following description when considered in connection with the accompanying drawings; in which:

Figure 1 is a diagrammatic perspective view of a portion of a glass tank, with flow spouts; the factory floor being broken away to permit illustration of forming machines in the basement. The forming machines are of any desired type, and they are therefore illustrated in diagrammatic fashion.

Figure 2:
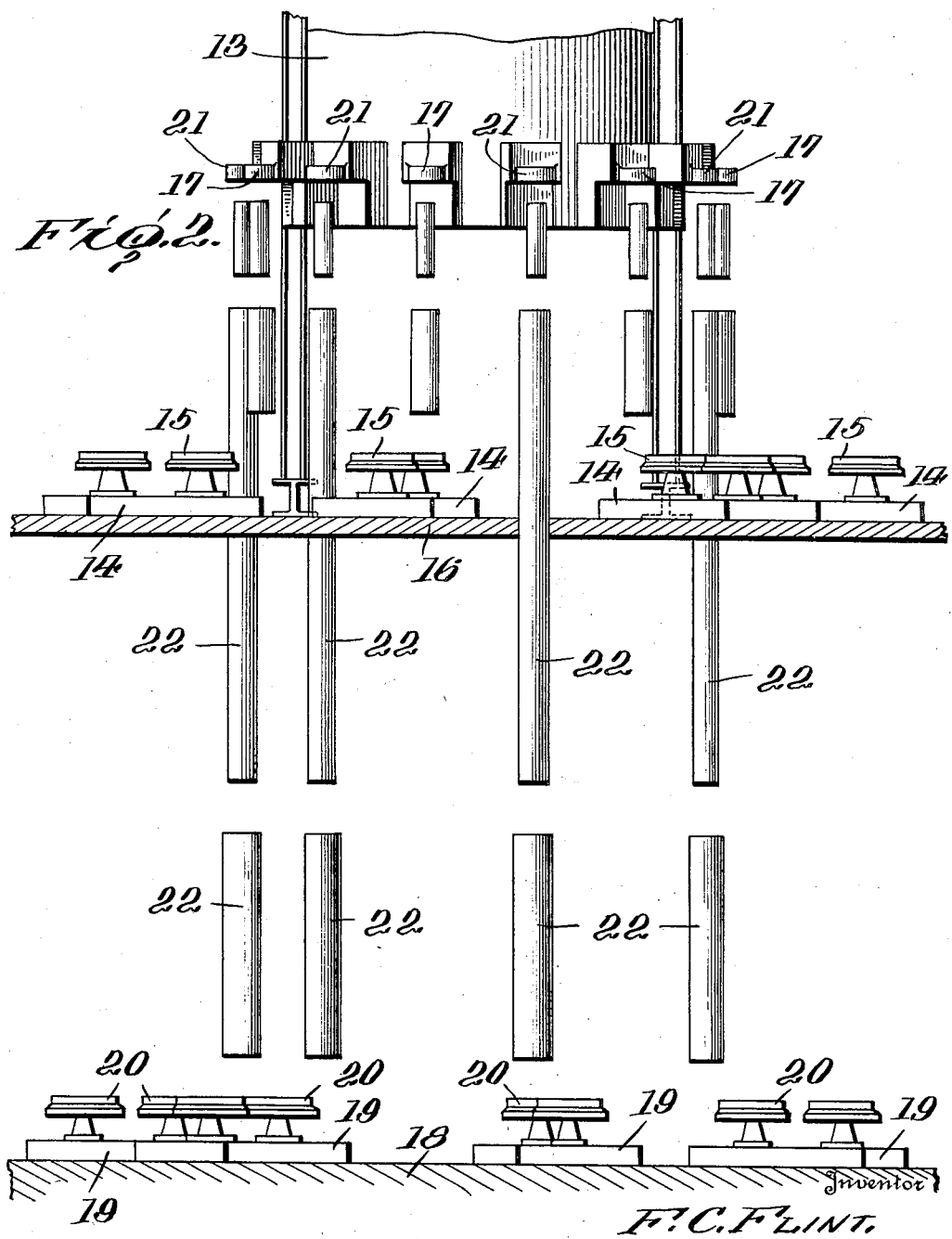
Figure 3:
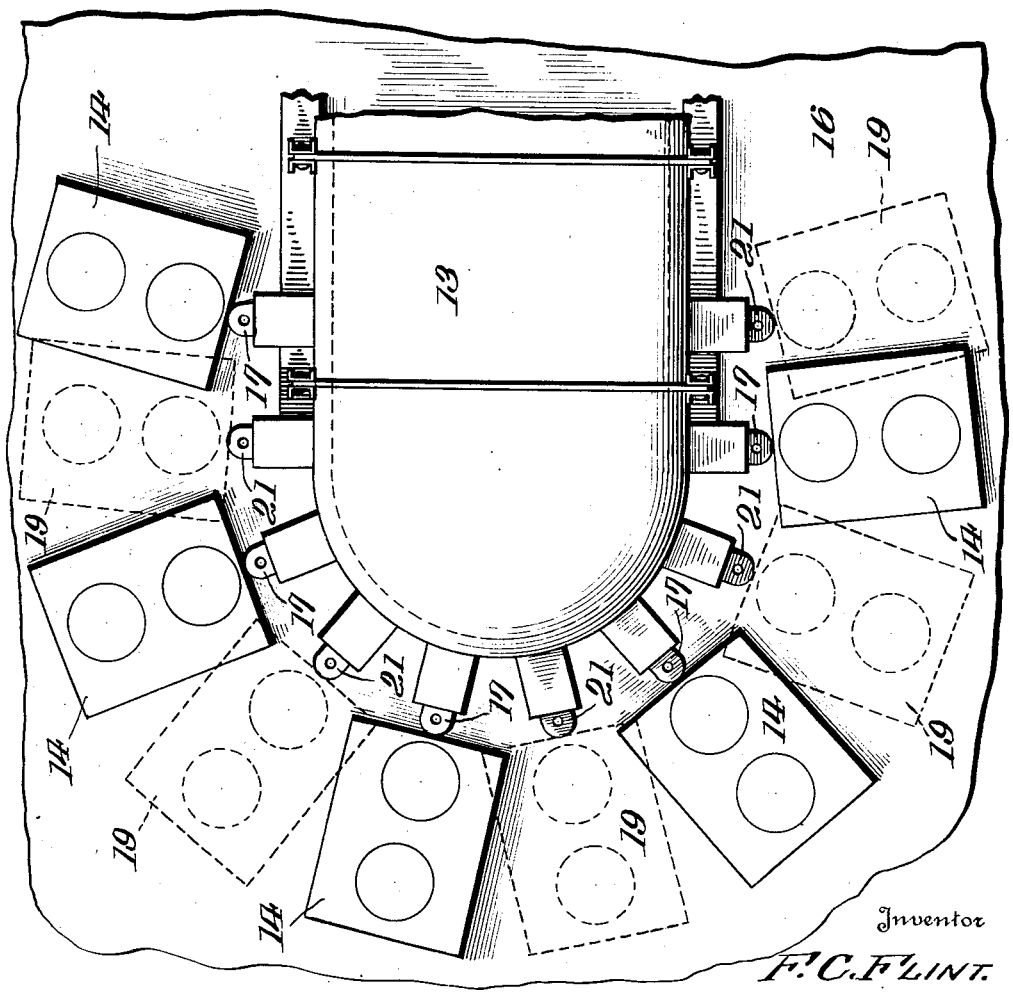

Figure 2 is a vertical sectional view taken through a portion of the factory, and illustrating a tank and forming machine arrangement by which five machines are mounted on the factory floor in accordance with the established practice, and five additional machines are mounted in the basement; and Figure 3 is a plan view of the same arrangement shown in Figure 2; the forming machines in the basement being indicated by dotted lines.

Referring to the drawings more in detail, and particularly to Figure 1, the factory floor is indicated by numeral 1, and a conventional continuous glass tank or furnace is indicated by numeral 2. This is a relatively small tank and in accordance with the established practice will accommodate only two conventional forming machines. The base plates for these two machines are indicated by numeral 3; and a conventional forming machine 4 is indicated diagrammatically on one of the base plates. It will be understood, of course, that a forming machine is mounted on each base plate shown in the drawings, but it is needless to indicate such forming machines; and where forming machines are illustrated a diagrammatic indication thereof is sufficient, as the particular forming machines form no part of the invention. Each of the forming machines 4 is arranged beneath an ordinary flow spout 5; each flow spout being provided with any desired type of feeder 6. It is understood, of course, that when rotary forming machines are used, of either the continuous or start and stop type, they are so arranged that the parison or blank molds are successively brought beneath the feeders, and in vertical alignment therewith; and that the feeders and forming machines are so timed that a charge of glass will be dropped into each parison mold as it reaches the feeding position.

All of the structure and arrangement described above is well known, and has been in common use for many years. But as stated hereinbefore, such an arrangement does not give a production equal to the capacity of the tank, and the fuel consumption is excessive. By what is believed to be a broadly new method and arrangement of forming machines I have been able to continuously employ the entire productive capacity of glass tanks, thereby making a marked advance in the economical manufacture of glassware. Referring further to Figure 1, numeral 7 indicates the basement floor of the factory, and two base plates are referred to by numeral 8. Each of these base plates carries a forming machine 9, which may be of any desired type. These forming machines are arranged beneath flow spout 10 equipped with feeders 11. It is of interest to note here that in the present installation the charges have a drop through the air of about sixteen feet to the parison molds, and without any guiding means. This long distance method of feeding charges, by dropping through the air the entire distance from the orifice in the flow spout to the factory floor, through an opening in the floor, and thence all the way to a forming machine on the next floor below, seems almost incredible to those skilled in this art; yet this method is in actual operation and is producing a better grade of ware than under the old practice. For the purpose of protecting the charges from air currents as they drop from the flow orifice to the basement, and also as a protection to the workmen, I preferably provide a shield 12 which extends continuously, or in sections, from a point adjacent the flow orifice to a point adjacent the forming machine on the basement floor or other floor below. While these shields are desirable they are not essential; and it is to be noted that they do not in any sense function as guides, as the glass charges do not even contact with the walls of the shields.

Before describing how the various advantages result from this novel arrangement illustrated in Figure 1, I shall refer briefly to a similar arrangement illustrated in Figures 2 and 3. The tank 13 illustrated diagrammatically in Figures 2 and 3, is of such size that in the standard prior practice it will accommodate five forming machines. The base plate for such forming machines are referred to by numeral 14, and the forming machines are referred to by numeral 15; the base plates being mounted on the factory floor 16. Numeral 17 refers to the conventional flow spouts for these forming machines; and it will be understood that each of these flow spouts is provided with a feeder of any desired type, but the scale is so small that no attempt has been made to show the feeders.

The lower floor is indicated by numeral 18, and mounted on this floor are five base plates 19, on which are mounted forming machines 20. The flow spouts for these machines are referred to by numeral 21, and shields 22 preferably extend from a point adjacent the flow orifice of the flow spouts, to a point adjacent the forming machines. While I have illustrated five forming machines on the lower floor, it will be understood that this number will vary from one up, depending upon the particular design of the tank, and on the type of forming machines used on this floor as well as on the upper floor.

The invention involved in the arrangement disclosed in Figure 1 is the same as that involved in the disclosure of Figures 2 and 3; and considering the great variety of tank designs now in use, and the variety of tanks that may in the future be designed, especially for use in connection with the invention disclosed herein, and also considering the wide variety of forming machines now in use, it is apparent that the number of different arrangements is almost unlimited; and I have merely illustrated two of such arrangements. In connection with the invention disclosed herein it is desirable, in some instances, to employ long-distance adjusting mechanism to regulate the feeder, the temperature of the glass, etc.; these adjusting mechanisms extending to the floor or floors below, and being within easy reach of the machine operator. It is also sometimes desirable to employ periscopes so that the operator on the lower floor may view the formation of the charges at the feeder; and various other details enter into the complete construction; but the present invention is in no manner restricted to any such details, and it is unnecessary to illustrate them.

The manner in which the invention operates to produce the desirable results, mentioned hereinbefore, will now be briefly described. As previously stated, glass tanks are designed to accommodate the maximum number of forming machines for the particular size of tank; and in so designing the tanks to meet this practical consideration, the melting area of the tanks is greater than is necessary, so that the capacity of the tank is greater than the capacity of the particular number of forming machines that it will accommodate. The result is that there is a surplus of glass in the tank which is not answering any useful purpose; and a large amount of fuel is being wasted. The present invention not only corrects these two most undesirable conditions, but also possesses numerous other advantages.

Let it be assumed that a tank has been designed to accommodate a maximum of five forming machines. This tank will necessarily have a surplus glass capacity, and this surplus glass is not being converted into glass articles, and fuel is required to maintain it at the required temperature. In accordance with the present invention, to overcome these conditions, it is only necessary to add one or more flow spouts to the tank and install one or more forming machines on a lower floor of the factory, beneath the added spout or spouts. Of course, the number of additional forming machines will vary with different tanks, depending upon the surplus capacity of the tank. But the number will be such as to enable it to continuously feed glass at a rate substantially equal to the melting capacity of the tank. Thus the rate of production of ware is increased, and a great economy of fuel is effected, for all the fuel is employed for a useful purpose. As far as I know it has never before been conceived that it is possible to drop charges of glass through this great distance, yet I have found it to be entirely practical, and consider that it constitutes a very distinct advance in the glass art, and its great possibilities will be at once apparent. The foregoing description has dwelt largely upon the addition of forming machines to tanks which were originally designed to feed only one floor of forming machines; but it will be understood, of course, that in accordance with this invention new tanks will be designed to feed two or more floors of forming machines, thus not only vastly increasing the productive capacity of a plant without increasing the size of the plant, but also producing the ware with a proportionately lower rate of fuel consumption.

Also the ware produced is of a better grade, and the percentage that is suitable for packing is greater. One of the reasons for rejecting ware is because of a poor finish; but in accordance with the present invention the charges drop through such a distance that they impact with the molds with a force heretofore impossible and insures a good finish on the article. Further, the shear mark commonly appearing on the machine made glasware, is practically eliminated; as the increased time involved in the fall of the charge, permits a more uniform distribution of heat, between the time of severing the charges and the time that they enter the molds.

Various other advantages of the invention will be apparent to those skilled in the art.

Having fully described my invention, what I claim as new and desire to secure by Letters Patent is:

1. The method of increasing the production of glassware which comprises dropping the glass charges vertically from a tank to forming machines arranged on different floors.

2. The method of increasing the production of glassware which consists in arranging the forming machines on two different levels, the two levels being spaced a vertical distance at least greater than the height of the forming machines, and dropping glass charges vertically from a tank to the forming machines on both levels.

3. The method of increasing and improving the production of glassware which comprises dropping glass charges from the flow spout of a glass tank, through an opening in the factory floor, to a mold on a forming machine arranged on a lower floor.

4. The method of increasing the production of glassware which comprises arranging on the floor with a glass tank and in cooperative relation with the tank the maximum number of forming machines the tank will accommodate, and arranging on a lower floor and in cooperative relation with the tank the number of forming machines necessary to operate the tank at capacity, and in dropping the charges through an opening in the first-mentioned floor to the forming machines on the lower floor.

5. An apparatus of the character described, including a glass tank mounted on the factory floor, said tank provided with a number of flow spouts and feeders equal to the number of forming machines the tank will accommodate on said floor, said tank provided with an additional flow spout and feeder, and an additional forming machine mounted on a lower floor and adapted to receive charges from said additional flow spout and feeder.

6. An apparatus of the character described, including a glass tank mounted on the factory floor, a plurality of forming machines mounted on said floor and in cooperative relation with the tank, a plurality of forming machines mounted on a lower floor and in cooperative relation with the tank, and means for feeding charges from the tank to the forming machines on the same floor, and through openings in the floor to the forming machines on a lower floor.

7. An apparatus of the character described, including a glass tank mounted on the factory floor, a plurality of forming machines mounted on said floor and in cooperative relation with the tank, a plurality of forming machines mounted on a lower floor and in cooperative relation with the tank, means for feeding charges from the tank to the forming machines on the same floor, and through openings in the floor to the forming machines on a lower floor, and means for shielding the charges from air currents.

8. An apparatus of the character described, including a glass tank, two or more tiers of forming machines associated with said tank, and means for feeding charges to the forming machines of said tiers from points above the upper tier.

9. An apparatus of the character described, including a glass tank mounted on the factory floor, one or more forming machines mounted on a lower floor, the factory floor provided with openings, and means for dropping charges from a point above the factory floor, through said openings, to the forming machines on the lower floor.

10. An apparatus of the character described, including a glass tank mounted on the factory floor, a plurality of flow spouts associated with said tank, and means for feeding charges from alternate spouts to forming machines arranged on different floors.

FRANCIS C. FLINT.